United States Patent
Jundt et al.

(10) Patent No.: US 12,441,287 B2
(45) Date of Patent: Oct. 14, 2025

(54) BRAKE SYSTEM FOR A UTILITY VEHICLE, AND METHOD FOR TESTING THE FUNCTIONALITY OF A SELECT-HIGH VALVE OF THE BRAKE SYSTEM

(71) Applicant: Knorr-Bremse Systeme Fuer Nutzfahrzeuge GmbH, Munich (DE)

(72) Inventors: Oliver Jundt, Hessigheim (DE); Max Michalski, Neubiberg (DE); Falk Hecker, Markgroeningen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 162 days.

(21) Appl. No.: 18/564,377

(22) PCT Filed: Jun. 10, 2022

(86) PCT No.: PCT/EP2022/065883
§ 371 (c)(1),
(2) Date: Nov. 27, 2023

(87) PCT Pub. No.: WO2023/274693
PCT Pub. Date: Jan. 5, 2023

(65) Prior Publication Data
US 2024/0375633 A1   Nov. 14, 2024

(30) Foreign Application Priority Data
Jun. 30, 2021   (DE) .................. 10 2021 206 902.9

(51) Int. Cl.
*B60T 17/22*   (2006.01)
*B60T 13/26*   (2006.01)
*B60T 13/68*   (2006.01)

(52) U.S. Cl.
CPC ............ *B60T 17/22* (2013.01); *B60T 13/268* (2013.01); *B60T 13/683* (2013.01); *B60T 2270/402* (2013.01); *B60T 2270/406* (2013.01)

(58) Field of Classification Search
CPC ...... B60T 17/22; B60T 13/268; B60T 13/683; B60T 2270/402; B60T 2270/406; B60T 8/1708; B60T 17/221; B60T 7/12
See application file for complete search history.

(56) References Cited

U.S. PATENT DOCUMENTS

| | | | |
|---|---|---|---|
| 2022/0144232 A1* | 5/2022 | Van Thiel | B60T 13/662 |
| 2023/0089211 A1* | 3/2023 | van Thiel | B60T 13/683 303/122.09 |

(Continued)

FOREIGN PATENT DOCUMENTS

| | | |
|---|---|---|
| DE | 10142790 A1 | 3/2003 |
| DE | 102019106243 A1 | 9/2020 |

OTHER PUBLICATIONS

International Search Report for PCT/EP2022/065883, Issued Oct. 10, 2022.

*Primary Examiner* — Thomas Ingram
(74) *Attorney, Agent, or Firm* — NORTON ROSE FULBRIGHT US LLP

(57) ABSTRACT

A method for testing functionality of a brake-system's select-high valve (SHV), including: comparing the pressure in a main-supply-circuit (MSC) with the pressure in a service-brake-circuit (SBC) and ascertaining that the SBC is being supplied with pressure from the other supply-circuit (OSC) if the pressure in the SBC is higher than the pressure in the MSC; increasing the pressure in the MSC above the pressure of the OSC; comparing the pressure in the MSC with the pressure in the SBC and ascertaining that the SBC is being supplied with pressure from the MSC when the pressure in the SBC at least approximately corresponds to (Continued)

the pressure in the MSC; and ascertaining that the SHV is functional if it has been ascertained that the SBC is being supplied with pressure from the OSC and that the SBC is being supplied with pressure from the MSC.

17 Claims, 2 Drawing Sheets

(56) References Cited

U.S. PATENT DOCUMENTS

2024/0208475 A1\* 6/2024 Buchert .................... B60T 8/92
2025/0188024 A1\* 6/2025 Kousaka ................. G02B 1/041
2025/0206282 A1\* 6/2025 Van Thiel ............. B60T 13/683

\* cited by examiner

BRAKE SYSTEM FOR A UTILITY VEHICLE, AND METHOD FOR TESTING THE FUNCTIONALITY OF A SELECT-HIGH VALVE OF THE BRAKE SYSTEM

FIELD OF THE INVENTION

The present invention relates to a brake system for a commercial vehicle and a method for testing a select-high-valve of the brake system, in particular for autonomous vehicles.

BACKGROUND INFORMATION

For safety reasons, pressure control modules for brakes of front axles and rear axles are supplied by different compressed air circuits in today's electro-pneumatic commercial vehicle brake systems, at least in compliance with the law in Europe. In the event of a failure of one of the compressed air supply circuits, however, in extreme cases the axles supplied by the failed compressed air supply circuit can no longer provide any braking power, so that an overall braking effect is not sufficient. As a way to counteract this fault, a select-high valve is used in the supply line to the pressure control module. For example, a select-high valve has two pressure inputs and one pressure outlet leading to the pressure control module and is used to always pass the higher input pressure to the outlet as the outlet pressure. It is placed in such a way that the pressure control module can be supplied via the respective inputs not only by an associated supply circuit, the main supply circuit, but also by an auxiliary consumer circuit, which supplies a pneumatic level control system, for example. The pressure control module is then always supplied by that circuit of the associated supply circuit and the auxiliary consumer circuit in which the higher pressure is present.

However, this safety function requires the select-high valve to function reliably. A human driver can visually or acoustically perceive the proper functioning of the brake system, and thus also of the select-high valve, for example by detecting leaks in the brake system, but this is not possible in this form with an autonomous vehicle. The functionality of the select-high valve, i.e. the assumption of different states by the valve, must therefore be monitored, especially in autonomous vehicles, which, however, is costly due to the use of additional sensor systems.

SUMMARY OF THE INVENTION

An underlying object of the invention is therefore to eliminate the aforementioned disadvantage and to provide a method as well as a brake system for a commercial vehicle for testing the functionality of a select-high-valve of a brake system that is simple and cost-effective.

The object may achieved by a method as described herein and a brake system as described herein. Advantageous further developments of the invention are contained in the further descriptions herein.

According to one aspect of the invention, a method for testing the functionality of a select-high valve of a brake system has the following steps: first detection of a pressure in the main supply circuit by means of a first pressure detection device and first detection of a pressure in the service brake circuit by means of a second pressure detection device; first comparison of the pressure in the main supply circuit with the pressure in the service brake circuit, and first ascertainment that the service brake circuit is being supplied with pressure from the other supply circuit if the detected pressure in the service brake circuit is higher than the detected pressure in the main supply circuit; increasing the pressure in the main supply circuit above the specified maximum pressure of the other supply circuit by means of the pressure source; second detection of the pressure in the main supply circuit by means of the first pressure detection device and second detection of the pressure in the service brake circuit by means of the second pressure detection device; second comparison of the pressure in the main supply circuit with the pressure in the service brake circuit, and second ascertainment that the service brake circuit is being supplied with pressure from the main supply circuit if the pressure detected in the service brake circuit at least approximately corresponds to the detected pressure in the main supply circuit; third ascertainment that the functionality of the select-high valve is present if the first ascertainment ascertains that the service brake circuit is being supplied with pressure from the other supply circuit, and the second ascertainment ascertains that the service brake circuit is being supplied with pressure from the main supply circuit.

This method makes it possible to identify the two different positions of the select-high valve and to ascertain the functionality of the select-high valve without the need to provide a pressure detection device in the other supply circuit.

The detected pressure is the pressure of a medium, usually compressed air in commercial vehicle brake systems, in the main supply circuit and the other supply circuit, which is usually a secondary consumer circuit.

When checking the functionality of the select-high valve, it is basically checked whether the select-high valve can assume different switching states, namely a first state in which it connects the service brake circuit to the other supply circuit and a second state in which it connects the service brake circuit to the main supply circuit.

These two states are ascertained as described below: In a situation where, at the time of a first detection, the pressure detected in the service brake circuit is higher than the pressure detected in the main supply circuit, it can be determined that the select-high valve is switched in such a way that it connects the service brake circuit and the other supply circuit, i.e. it has assumed the first state, because the pressure in the main supply circuit is obviously too low for the detected pressure to be achieved in the main supply circuit, since the pressure in the other supply circuit is obviously higher.

On ascertaining the first state it should be checked whether the service brake circuit is being supplied by the other supply circuit. If the detected pressure in the service brake circuit is not higher than the detected pressure in the main supply circuit, it is not possible to reliably ascertain this and the comparison is repeated. Before a further comparison, optionally the pressure in the main supply circuit can be reduced by operating the brake.

Following the ascertainment of the first state in which it could be clearly seen that the select-high valve is switched in such a way as to connect the service brake circuit and the other supply circuit, the pressure in the supply circuits is increased by the pressure source. The pressure in the main supply circuit is usually increased to 12.5 bar and the pressure in the other supply circuit is usually limited to 8.5 bar.

Subsequently, the pressure in the service brake circuit is again compared with the pressure in the main supply circuit and if the two pressures are at least approximately the same, it can be determined that the select-high valve is now switched in such a way that it connects the service brake circuit and the main supply circuit, in which there is now a pressure that is higher than the pressure in the other supply circuit. i.e. it occupies the second state. In this context, "at least approximately" means that the pressures detected are either the same or may differ slightly, which may occur due to tolerances of the pressure detection devices or due to design conditions of intermediate brake lines or components.

According to a further embodiment of the method, the first comparison and the subsequent steps are carried out only if the pressure detected in the main supply circuit does not exceed a predetermined threshold value of the pressure in the main supply circuit, thus allowing the method to be carried out further only if a promising result can be expected.

In accordance with an advantageous embodiment of the method, the method ends before the pressure is increased if the detected pressure in the service brake circuit is equal to the detected pressure in the main supply circuit.

This feature ends the method, since it is not possible to identify the state of the select-high valve, since on the one hand the service brake circuit could be supplied by the main supply circuit, since the two pressures detected are equal, and on the other hand by the other supply circuit, the pressure of which is not detected. Since no clear result is obtained, a fault can be stored, in an alternative embodiment only after a repeated occurrence, which can be deleted again at the next check if the result is clear in this situation. Alternatively, the error must be investigated manually.

In another advantageous embodiment of the method, wherein the commercial vehicle is an autonomous vehicle, the method is carried out before the start of an autonomous journey, which ensures that when the autonomous vehicle drives off it is known whether the select-high valve is not functional.

Therefore, the method serves as a safety check here.

In a further advantageous embodiment of the method, the start of the autonomous journey is only enabled if a lack of functionality of the select-high valve is not ascertained, it being possible for the safety to be increased by way of preventing the autonomous journey being started when the select-high valve is not functional.

In a further advantageous embodiment of the method, the method may be carried out periodically after a predetermined period of time, whereby the functionality of the select-high valve is monitored cyclically. This check can be carried out as an alternative to or in addition to ascertaining the functionality of the select-high valve before the start of the autonomous journey.

According to another aspect of the invention, a brake system for a commercial vehicle has a service brake circuit with a first pressure detection device designed to detect a pressure in the service brake circuit, a main supply circuit with a second pressure detection device designed to detect a pressure in the main supply circuit, a further, different supply circuit, a pressure source for the main supply circuit and the other supply circuit, and a select-high valve that is connected to the main supply circuit and the other supply circuit at inputs and is connected to the service brake circuit at an outlet, wherein the select-high valve is designed to establish a connection between the service brake circuit on the one hand and one of the main supply circuit and the other supply circuit on the other hand. The brake system also has an evaluation unit that is designed to perform one of the above methods.

With such a brake system, it is possible to ascertain the functionality of the select-high valve without the need to provide a pressure detection device in the other supply circuit, so that the functionality can be ascertained by means of the sensor system that is normally provided.

In accordance with an advantageous embodiment of the brake system, it comprises an electronic service brake control unit that is designed to control components of the brake system, and the evaluation unit is integrated into the service brake control unit.

As a result, it is not necessary to provide a separate evaluation unit that must be connected and fixed accordingly, so that the overall cost for this can be reduced.

In accordance with a further advantageous embodiment of the brake system, the brake system has a pressure sensor as the first pressure detection device downstream of the select-high valve, which is designed to detect the pressure in the service brake circuit downstream of the select-high valve.

The pressure sensor, which is provided as a pressure detection device downstream of the select-high valve, allows simple and accurate detection of the pressure in the service brake circuit.

In a further advantageous embodiment, the brake system has a pressure control module in the service brake circuit with a pressure control device that is designed to control a predetermined brake pressure for brake cylinders in the service brake circuit, wherein the pressure sensor is provided downstream of a pressure control device of the pressure control module.

In this embodiment, it is possible to use a pressure sensor that is required for the function of the pressure control module anyway, so that it is not necessary to provide an additional pressure sensor with a corresponding cost of installation and connection, so that the overall cost is reduced.

In another advantageous embodiment of the brake system, the pressure control module comprises the pressure sensor.

This integration eliminates the need for a separate attachment and separate connection of the pressure sensor, further reducing the cost of the provision thereof.

According to a further advantageous embodiment, the brake system has a pressure control valve in the service brake circuit downstream of the pressure control module that is designed to control a pressure in the service brake circuit between the pressure control valve and the brake cylinder and that is designed to shut off the service brake circuit when appropriately controlled.

The provision of this pressure control valve makes it possible to check the functionality of the select-high valve even when driving. It is possible to close the pressure control valve, which means that the pressure upstream of the pressure control valve in the service brake circuit is not transmitted to the brake cylinder, so that no braking is carried out during the check of the functionality of the select-high valve. In addition, this pressure control valve allows for lower compressed air consumption during the check, as the entire service brake circuit does not have to be filled when checking the select-high valve.

In accordance with another advantageous embodiment of the brake system, the other supply circuit is equipped with a check valve, which is designed to shut off a flow in the other supply circuit towards the pressure source.

The check valve reduces a loss of pressure in the other supply circuit while the vehicle is at a standstill, so that it is to be expected that the pressure in the other supply circuit will be temporarily higher than in the main supply circuit and the first detection of the pressure difference will give a clear result.

In a further advantageous embodiment, the brake system has a further main supply circuit, and the main supply circuit and the further main supply circuit have an overflow valve, wherein the overflow valve is designed to at least temporarily equalize a pressure in the main supply circuit and the further main supply circuit.

The further main supply circuit enables the supply and control of brakes other than those supplied and controlled by the main supply circuit. This increases safety in the event of a failure of one of the main supply circuits. In the event of a major leakage in one of the main supply circuit and the further main supply circuit, the overflow valve is closed in order to maintain the functionality of the other circuit, so that the pressure is temporarily not equalized in this situation.

In another advantageous embodiment of the brake system, the other supply circuit has a storage element with an additional air volume, which prevents a pressure in the other supply circuit from dropping too much in the event of air consumption due to filling of the service brake circuit, so that the first detection of the pressure difference gives a clearer result.

In accordance with another advantageous embodiment of the brake system, the select-high valve is designed to establish a connection between the service brake circuit and the main supply circuit in the event of equal pressure in the main supply circuit and the other supply circuit.

This feature allows the service brake circuit to be supplied by the main supply circuit actually intended for this purpose, so that the other supply circuit, which is only provided for safety reasons, is not used for the compressed air supply.

The invention is explained below on the basis of exemplary embodiments with reference to the attached drawings.

DETAILED DESCRIPTION

Figure 1:
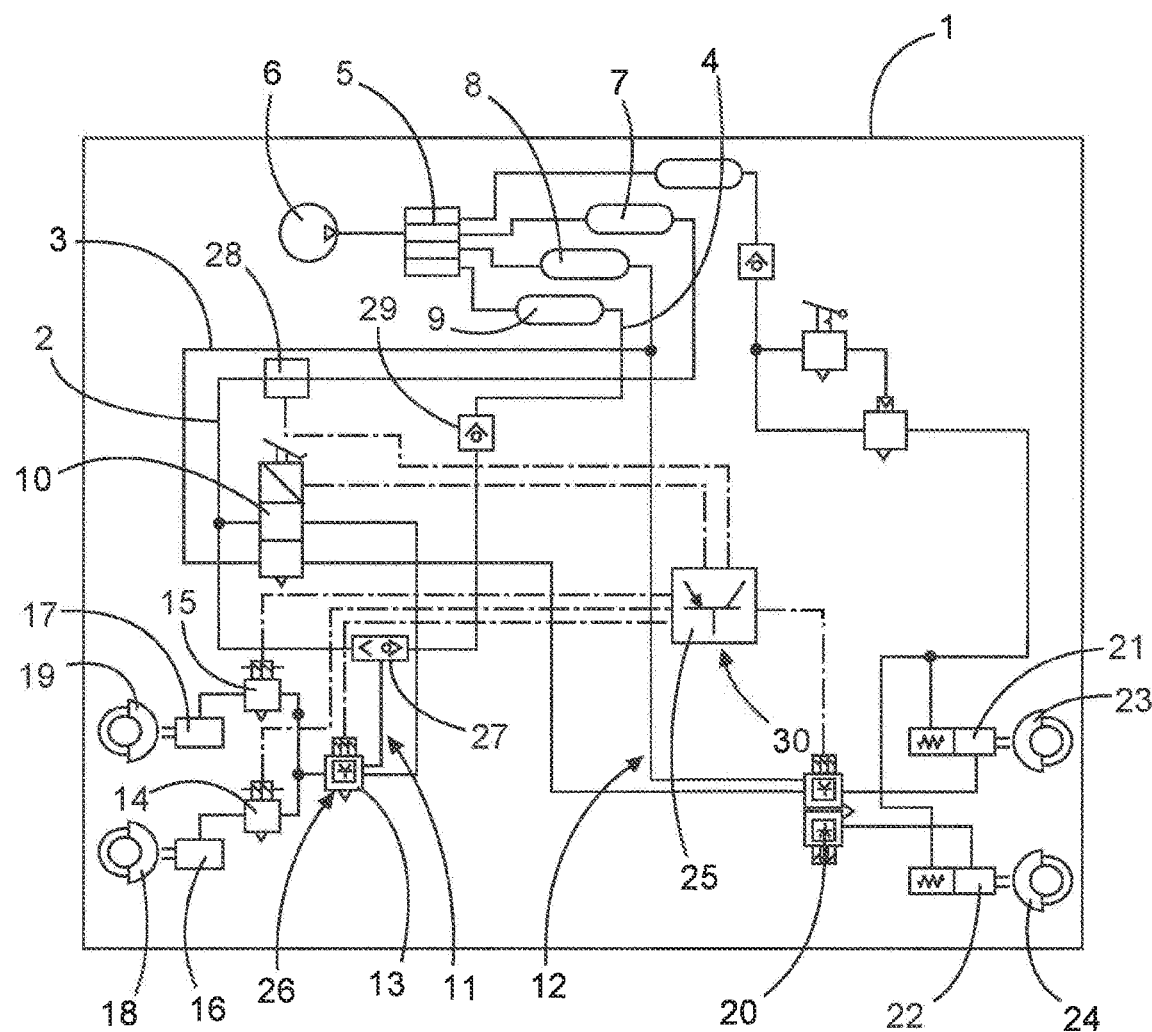
FIG. 1 shows a brake system according to the invention in principle.

FIG. 1 shows a brake system 1 for a commercial vehicle in principle. The brake system 1 has as compressed air supply circuits a main supply circuit 2, a further main supply circuit 3 and another supply circuit 4, which occasionally has a lower pressure and occasionally a higher pressure than the main supply circuit 2. The main supply circuit 2, the further main supply circuit 3 and the other supply circuit 4 are connected by an air treatment unit with an overflow valve 5 to a compressor as the pressure source 6 for the main supply circuit 2, the further main supply circuit 3 and the other supply circuit 4. The overflow valve 5 allows a pressure in the main supply circuit 2 and the further main supply circuit 3 to be equalized, at least temporarily. In the event of a major leakage in one of the main supply circuit 2 and the further main supply circuit 3, the overflow valve 5 is closed so that the pressure in the other of the main supply circuit 2 and the further main supply circuit 3 is maintained in order to ensure a braking effect. In alternative embodiments, the overflow valve 5 is not provided and/or the pressure source 6 is not provided as a compressor but, for example, as a pressure accumulator with a large volume. In addition, alternative embodiments provide for a different number of main supply circuits or other supply circuits. In addition, a first pressure accumulator 7 in the main supply group 2, a second pressure accumulator 8 in the further main supply group 3 and a third pressure accumulator 9 in the other supply circuit 4 are provided in order to buffer a compressed air volume for a currently larger air demand as a storage element with an additional air volume. In alternative embodiments, no pressure accumulators or another number of pressure accumulators are provided.

In addition, for supplying and controlling brakes 18, 19, 23, 24 the brake system has a service brake circuit 11 as a so-called "circuit 1" for brakes 18, 19 of a front axle and another service brake circuit 12 as a so-called "circuit 2" for brakes 23, 24 of a rear axle. In the service brake circuit 11, the components of brake system 1 are a pressure control module 13 and two pressure control valves 14, 15 downstream of the pressure control module 13 between the pressure control module 13 and a respective brake cylinder 16, 17 for the brakes 18, 19 on the front axle.

In the further service brake circuit 12, a further pressure control module 20 upstream of brake cylinders 21, 22 for the brakes 23, 24 on the rear axle is provided as a component of the brake system 1.

The pressure control modules 13, 20 control a predetermined brake pressure for the brake cylinders 16, 17 in the service brake circuit 11 and for the brake cylinders 21, 22 in the further service brake circuit 12. The pressure control valves 14, 15 are used, for example, as ABS valves, to control a pressure in the service brake circuit 11 between the pressure control valves 14, 15 and the brake cylinders 16, 17, and, if appropriately controlled, to shut off, vent or control the service brake circuit 11 "to build-up".

In alternative embodiments, it is possible that not all of these components are provided, or that the brake system 1 has further components.

Furthermore, the brake system 1 has a service brake control unit 25, which is connected to the pressure control modules 13, 20 as well as the pressure control valves 14, 15 via a CAN bus and to the foot brake module 10 via a data bus in order to control these components or to be controlled by them. In alternative embodiments, these connections can also be carried out via a different data bus system or conventionally wired.

In addition, The brake system 1 has a select-high valve 27 that is connected at its inputs to the main supply circuit 2 and the other supply circuit 4 and at its output to the service brake circuit 11. The select-high valve 27 is designed to establish a connection between the service brake circuit 11 on the one hand and to one from the main supply circuit 2 and the other supply circuit 4 on the other hand. In the event of equal pressure in the main supply circuit 2 and the other supply circuit 4, the select-high valve 27 establishes a connection between the service brake circuit 11 and the main supply circuit 2. In alternative embodiments, in the event of equal pressure in the main supply circuit 2 and the other supply circuit 4, the select-high-valve 27 establishes a connection between the service brake circuit 11 and the other supply circuit 4, or a particular connection is not made preferentially but by chance.

The main supply circuit 2 and the further main supply circuit 3 are pneumatically connected to a foot brake module 10. The foot brake module 10 is operated by a human driver via a foot pedal to specify a braking force. In addition, the foot brake module 10 is connected to the service brake control unit 25 via the data bus in order to transmit the desired braking force to it, wherein the service brake control unit 25 then controls the pressure control modules 13, 20 accordingly for the predetermined brake pressure. The pressure control modules 13, 20 are also pneumatically connected to the foot brake module 10. In an autonomous vehicle the braking force is additionally requested via a data line in the form of a so-called deceleration request.

In the service brake circuit 11, a pressure sensor is provided as a first pressure detection device 26. The pressure sensor is integrated into the pressure control module 13, so that the pressure control module 13 comprises the pressure sensor. The pressure sensor is provided downstream of a pressure regulating device of the pressure control module 13. In alternative embodiments, the first pressure detection device 26 may also be provided at a different location downstream of the select-high valve 27, so that a pressure in the service brake circuit 11 downstream of the select-high valve is detected.

In the main supply circuit 2, a second pressure detection device 28 that is connected to the service brake control unit 25 is provided for detecting a pressure in the main supply circuit 2. Optionally, the second pressure detection device 28 is integrated into an air treatment device that is connected to the service brake control unit 25 via the CAN bus.

The other supply circuit 4 has a check valve 29, which is designed to shut off a flow of compressed air in the other supply circuit 4 towards the pressure source 6. In alternative embodiments, no such check valve is provided.

Finally, the brake system 1 has an evaluation unit 30. The evaluation unit 30 compares the pressure detected by the second pressure detection device 28 in the main supply circuit 2 and the pressure detected by the first pressure detection device 26 in the service brake circuit 11. In addition, the evaluation unit 30 ascertains the select-high-valve 27 functionality if the detected pressure in the service brake circuit 11 is higher than the detected pressure in the main supply circuit 2, and thus it is ascertained that the service brake circuit 11 is connected to the other supply circuit 4 by means of the select-high valve 27 and, after an increase by means of the pressure source 6 in the pressure in the main supply circuit 2, in Europe usually to 12.5 bar, above a specified maximum pressure of the other supply circuit 4, in Europe usually 8.5 bar, it is ascertained that the service brake circuit 11 is connected to the main supply circuit 2 by means of a detected pressure in the service brake circuit 11 that corresponds at least approximately to the detected pressure in the main supply circuit 2. In this context, "at least approximately" means that the pressures detected are either the same or may differ slightly, which may occur due to tolerances of the pressure sensing device or due to design conditions of intermediate brake lines and components.

The evaluation unit 30 is integrated into the service brake control unit 25. In alternative versions, the evaluation unit 30 can also be integrated into another control unit or can be provided separately.

Figure 2:
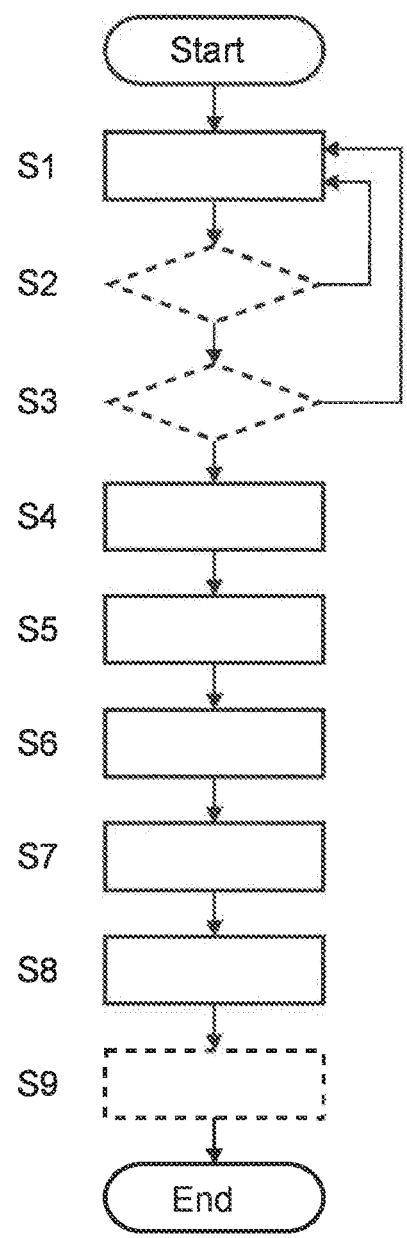
FIG. 2 shows a flow diagram of a method according to the invention.

FIG. 2 shows a flow diagram of a method according to the invention. During operation, the brake system 1 performs the method for testing the functionality of the select-high valve 27. The method has the following steps:

In a first step S1, a first detection of a pressure in the main supply circuit 2 is carried out by means of the second pressure detection device 28 and a first detection of a pressure in the service brake circuit 11 by means of the first pressure detection device 26.

In a second step, S2, it is determined whether the detected pressure in the main supply circuit 2 does not exceed a predetermined threshold value, for example 4 bar. If the detected pressure in the main supply circuit 2 exceeds the predetermined threshold, the method returns to step S1 and the following steps are not performed. In an alternative embodiment of the method, no threshold value is taken into account, but the following steps are always carried out.

However, if the threshold value is not exceeded, in a third step S3 it is determined whether the detected pressure in the service brake circuit 11 is equal to the detected pressure in the main supply circuit 2. If it is determined that the detected pressure in service brake circuit 11 is equal to the detected pressure in the main supply circuit 2, the method returns to step S1 and the following steps are not performed. Optionally, before returning to step S1, the service brake circuit 11 is actively emptied or depressurized or the pressure in it is reduced by operating the brake. In an alternative embodiment of the method, the following steps are still carried out.

In a fourth step, S4, the pressure in the main supply circuit 2 is compared with the pressure in the service brake circuit 11 and a first ascertainment is made that the service brake circuit 11 is being supplied with pressure from the other supply circuit 4 if the detected pressure in the service brake circuit 11 is higher than the detected pressure in the main supply circuit 2.

In a fifth step, S5, the pressure in the main supply circuit 2 is increased above the specified maximum pressure of the other supply circuit 4, which is usually 8.5 bar in Europe, by means of the pressure source 6.

Subsequently, in a sixth step S6, a second detection of the pressure in the main supply circuit 2 is carried out by means of the second pressure detection device 28 and a second detection of the pressure in the service brake circuit 11 by means of the first pressure detection device 26.

Subsequently, in a seventh step S7, a second comparison of the pressure in the main supply circuit 2 with the pressure in the service brake circuit 11 and a second ascertainment that the service brake circuit 11 is being supplied with pressure from the main supply circuit 2 if the detected pressure in the service brake circuit 11 is at least approximately equal to the detected pressure in the main supply circuit 2 are carried out.

Finally, in an eighth step S8, it is ascertained that the functionality of the select-high valve 27 is present if the first determination ascertains that the service brake circuit 11 is being supplied with pressure from the other supply circuit 4 and the second determination ascertains that the service brake circuit 11 is being supplied with pressure from the main supply circuit 2.

The commercial vehicle is an autonomous vehicle and the method for testing the functionality of the select-high valve 27 of the brake system 1 is carried out before starting an autonomous journey. In an alternative embodiment, the method for testing the functionality of the select-high valve 27 is carried out periodically either alternatively to or additionally following a predetermined period of time, for example every two weeks.

If the method for testing the functionality of the select-high valve 27 is performed prior to starting, the start of the autonomous journey is optionally enabled in step S9 only if the absence of functionality of the select-high valve 27 is not ascertained.

The specified pressures are specified as examples to show which pressure differences are favorable to obtaining a reliable test result. For the specified pressures, a tolerance of approx. 0.5 bar is taken into account for all queries.

All features presented in the description, the following claims and the drawings may be essential to the invention either individually or in any combination with each other.

REFERENCE SIGN LIST 1 brake system
2 main supply circuit
3 further main supply circuit
4 other supply circuit
5 overflow valve
6 pressure source
7 first pressure accumulator
8 second pressure accumulator
9 third pressure accumulator
10 foot brake module
11 service brake circuit
12 additional service brake circuit
13 pressure control module
14, 15 pressure control valve
16, 17 brake cylinder
18, 19 front axle brake
20 further pressure control module
21, 22 brake cylinder
23, 24 rear axle brake
25 service brake control unit
26 first pressure detection device
27 select-high valve
28 second pressure detection device
29 check valve
30 evaluation unit

The invention claimed is:

1. A method for testing a functionality of a select-high valve of a brake system, the method comprising:
   first detecting a pressure in a main supply circuit by a first pressure detection device and first detecting a pressure in a service brake circuit by a second pressure detection device;
   first comparing a pressure in the main supply circuit with the pressure in the service brake circuit, and first ascertaining that the service brake circuit is being supplied with pressure from an other supply circuit if the detected pressure in the service brake circuit is higher than the detected pressure in the main supply circuit;
   increasing the pressure in the main supply circuit above a specified maximum pressure of the other supply circuit by a pressure source;
   second detecting the pressure in the main supply circuit by the first pressure detection device and second detecting the pressure in the service brake circuit by the second pressure detection device;
   second comparing the pressure in the main supply circuit with the pressure in the service brake circuit, and second ascertaining that the service brake circuit is being supplied with pressure from the main supply circuit if the detected pressure in the service brake circuit is at least approximately equal to the detected pressure in the main supply circuit; and
   third ascertaining that the functionality of the select-high valve is present if the first ascertainment ascertains that the service brake circuit is supplied with pressure from the other supply circuit and the second ascertainment ascertains that the service brake circuit is supplied with pressure from the main supply circuit.

2. The method of claim 1, wherein the first comparing and the subsequent steps are only carried out if the pressure detected in the main supply circuit does not exceed a previously ascertained threshold value of the pressure in the main supply circuit.

3. The method of claim 1, wherein the method ends before increasing the pressure if the detected pressure in the service brake circuit is equal to the detected pressure in the main supply circuit.

4. The method of claim 1, wherein the commercial vehicle is an autonomous vehicle, and the method is carried out at the start of an autonomous journey.

5. The method of claim 4, wherein the autonomous journey is only enabled if a lack of functionality of the select-high valve is not ascertained.

6. The method of claim 1, wherein the method is carried out after a predetermined period of time.

7. The method of claim 1, wherein the method is carried out periodically after a predetermined period of time.

8. A brake system for a commercial vehicle, comprising:
   a service brake circuit with a first pressure detection device configured to detect a pressure in the service brake circuit;
   a main supply circuit with a second pressure detection device configured to detect a pressure in the main supply circuit;
   another, different supply circuit;
   a pressure source for the main supply circuit and/or the other supply circuit; and
   a select-high valve with at least two inputs and at least one outlet, which is connected at the inputs to the main supply circuit and to the other supply circuit and at the output to the service brake circuit, wherein the select-high valve is configured to establish a connection between the service brake circuit on the one hand and one of the main supply circuit and the other supply circuit on the other hand; and
   an evaluation unit configured to perform a method for testing a functionality of a select-high valve of a brake system, by performing the following:
      first detecting a pressure in a main supply circuit by the first pressure detection device and first detecting a pressure in the service brake circuit by the second pressure detection device;
      first comparing a pressure in the main supply circuit with the pressure in the service brake circuit, and first ascertaining that the service brake circuit is being supplied with pressure from the other supply circuit if the detected pressure in the service brake circuit is higher than the detected pressure in the main supply circuit;
      increasing the pressure in a main supply circuit above the specified maximum pressure of the other supply circuit by a pressure source;
      second detecting the pressure in the main supply circuit by the first pressure detection device and second detecting the pressure in the service brake circuit by the second pressure detection device;
      second comparing the pressure in the main supply circuit with the pressure in the service brake circuit, and second ascertaining that the service brake circuit is being supplied with pressure from the main supply circuit if the detected pressure in the service brake circuit is at least approximately equal to the detected pressure in the main supply circuit; and
      third ascertaining that the functionality of the select-high valve is present if the first ascertainment ascertains that the service brake circuit is supplied with pressure from the other supply circuit and the second ascertainment ascertains that the service brake circuit is supplied with pressure from the main supply circuit.

9. The brake system of claim 8, wherein the brake system has an electronic service brake control unit configured to control components of the brake system, and the evaluation unit is integrated into the service brake control unit.

10. The brake system of claim 8, wherein the first pressure detection device has a pressure sensor downstream of the select-high valve that is configured to detect the pressure in the service brake circuit downstream of the select-high valve.

11. The brake system of claim 10, wherein the brake system has a pressure control module with a pressure control device configured to control a predetermined brake pressure for brake cylinders in the service brake circuit, and the pressure sensor is provided downstream of the pressure control device.

12. The brake system of claim 11, wherein the pressure control module includes the pressure sensor.

13. The brake system of claim 11, wherein the brake system has a pressure control valve in the service brake circuit downstream of the pressure control module that is configured to control a pressure in the service brake circuit between the pressure control valve and the brake cylinder and that is configured to shut off the service brake circuit when appropriately controlled.

14. The brake system of claim 8, wherein the other supply circuit includes a check valve that is configured to shut off a flow in the other supply circuit towards the pressure source.

15. The brake system of claim 8, wherein the brake system has a further main supply circuit, and the main supply circuit and the further main supply circuit have an overflow valve, and wherein the overflow valve is configured to equalize a pressure in the main supply circuit and the further main supply circuit at least temporarily.

16. The brake system of claim 8, wherein the other supply circuit has a storage element with an additional volume of air.

17. The brake system of claim 8, wherein the select-high valve is configured to establish a connection between the service brake circuit and the main supply circuit when there is an equal pressure in the main supply circuit and the other supply circuit.

* * * * *